Nov. 22, 1955 — E. O. SCHONSTEDT — 2,724,250
COUPLING FOR SHAFTS
Filed Aug. 28, 1952 — 3 Sheets-Sheet 1

INVENTOR
ERICK O. SCHONSTEDT
BY
ATTORNEYS

Nov. 22, 1955  E. O. SCHONSTEDT  2,724,250
COUPLING FOR SHAFTS
Filed Aug. 28, 1952  3 Sheets-Sheet 2

INVENTOR
ERICK O. SCHONSTEDT
ATTORNEYS

Nov. 22, 1955  E. O. SCHONSTEDT  2,724,250
COUPLING FOR SHAFTS

Filed Aug. 28, 1952  3 Sheets-Sheet 3

INVENTOR
ERICK O. SCHONSTEDT

BY
ATTORNEYS

United States Patent Office 2,724,250
Patented Nov. 22, 1955

2,724,250

COUPLING FOR SHAFTS

Erick O. Schonstedt, Silver Spring, Md., assignor to the United States of America as represented by the Secretary of the Navy Application August 28, 1952, Serial No. 306,972

5 Claims. (Cl. 64—15)

(Granted under Title 35, U. S. Code (1952), sec. 266)

The invention described herein may be manufactured and used by or for the Government of the United States of America for governmental purposes without the payment of any royalties thereon or therefor.

The present invention relates to apparatus for coupling a pair of shafts. More particularly the invention relates to coupling apparatus wherein slight misalignment both as to axis of rotation and angle of axial intersection of the control shafts of delicate apparatus such, for example as a synchronous control transformer and an indexing mechanism therefor, is compensated for.

Prior art coupling devices have the disadvantage of producing backlash in the rotary motion thereof and bending or flexing of the shafts connected thereto which causes inaccuracies in the output of the transformers of other such apparatus. The present invention overcomes the disadvantages of the prior art by providing a coupling in which rotary backlash is eliminated and misalignment of the shafts is compensated for in a substantial manner. Adjustment is provided in the apparatus in the preferred form thereof for compensating for eccentricity of the control shaft of such devices, and in the alternative form thereof, eccentricity thereof is compensated for by finish machining certain portions of the coupling after the mounting thereof on the shafts. Apparatus is also provided for causing the axes of the two shafts to intersect at a point within the coupling, thus assuring a smooth rotary drive from one shaft to the other without placing stresses or strains on the shafts tending to bend or flex the shafts during rotation thereof, such bending or flexing causing inaccurate output of the transformer through changes in clearances between the various components contained therein.

An object of the present invention is to provide a new and improved coupling for shafts in which bending or flexing of the coupled shafts is avoided.

Another object is to provide a new and improved coupling for shafts in which slight axial misalignment of the coupled shafts is compensated for.

Still another object is to provide a new and improved coupling for connecting the shaft of a synchro control transformer with the shaft of a mechanism for indexing the angular position of the transformer, the coupling being free of lost motion.

A further object of the invention is to provide a new and improved shaft coupling in which the axes of the coupled shafts are maintained in a condition of intersection at one point without stress or strain of the shafts.

Other objects and many of the attendant advantages of this invention will be readily appreciated as the same becomes better understood by reference to the following detailed description when considered in connection with accompanying drawings wherein.

Figure 1:
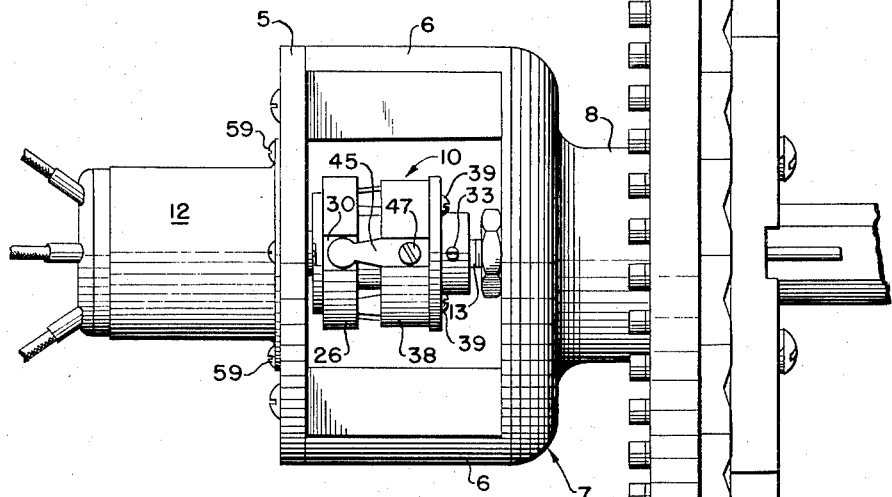
Fig. 1 is a side elevation of a preferred form of the coupling of the present invention and showing a synchro control transformer and an indexing mechanism connected thereby.
Figure 5:
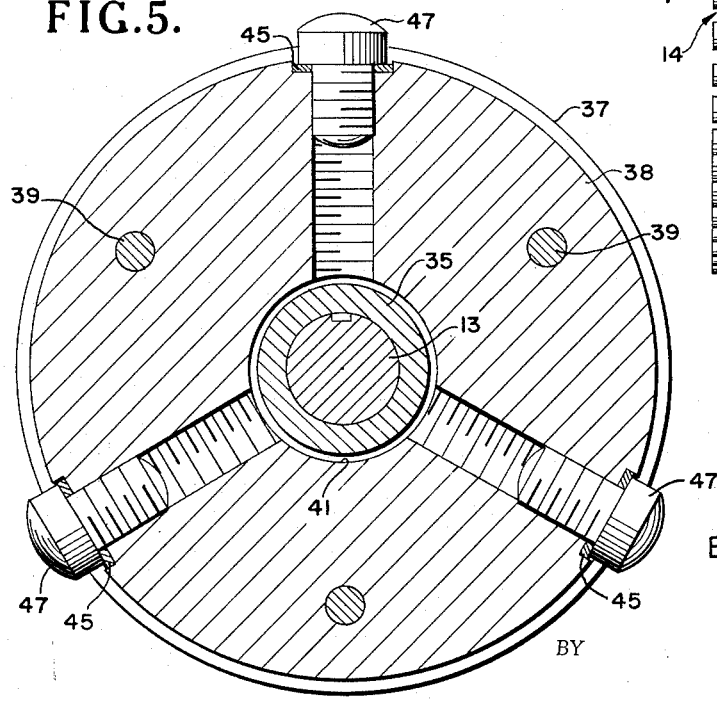
Fig. 5 is a sectional view taken along the line 5—5 of Fig. 4.
Figure 2:
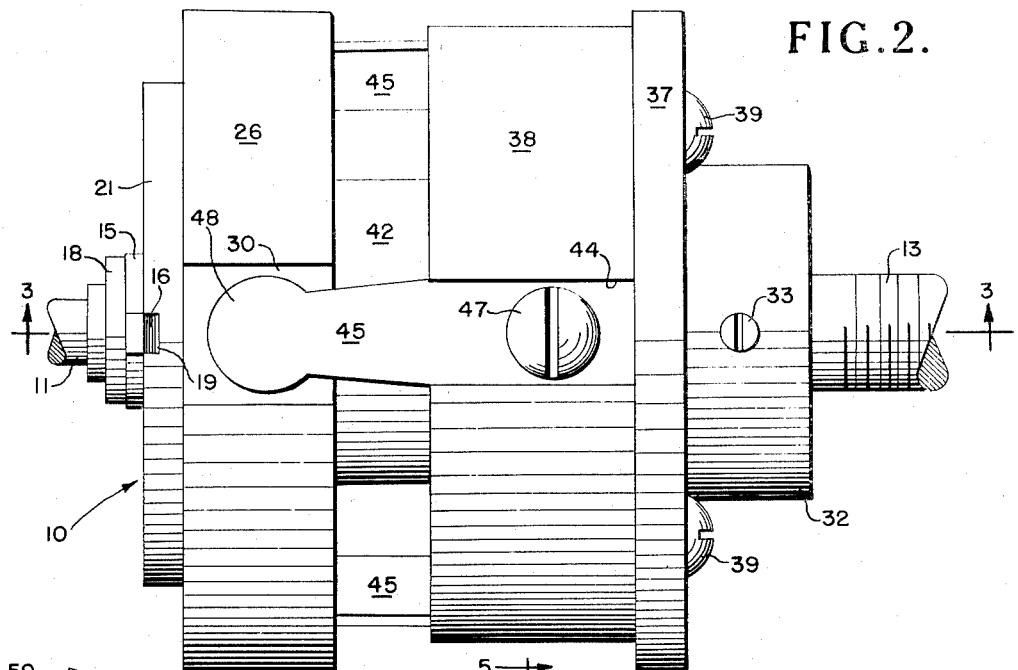
Fig. 2 is an enlarged top plan view of the coupling of Fig. 1.
Figure 3:
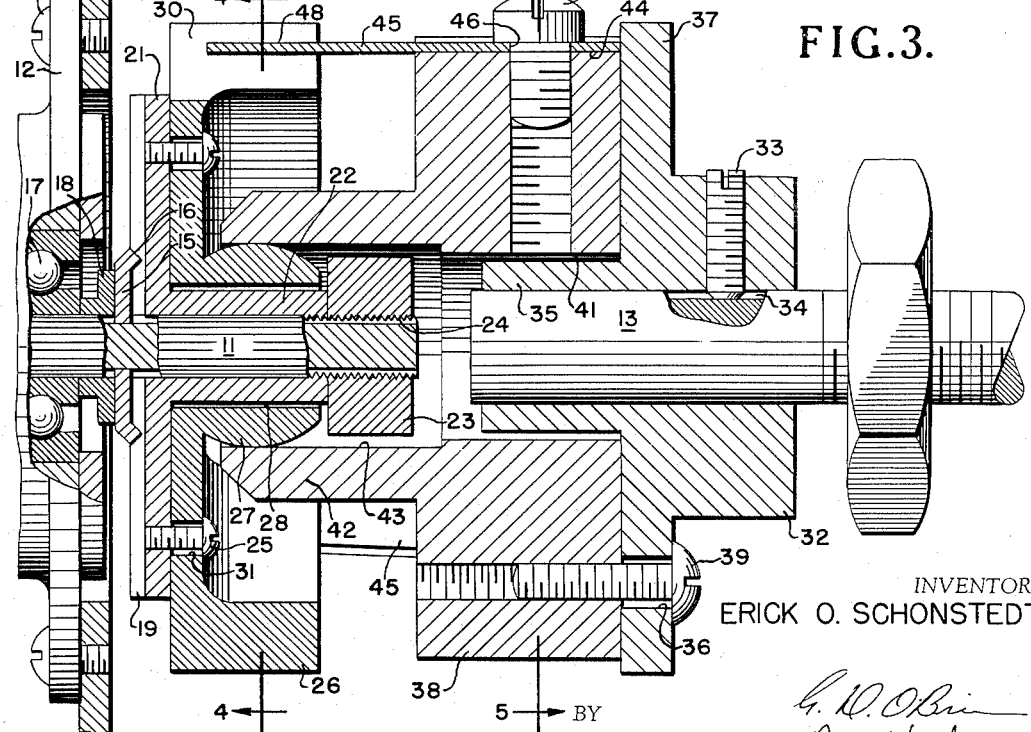
Fig. 3 is a sectional view taken along the line 3—3 of Fig. 2.
Figure 4:
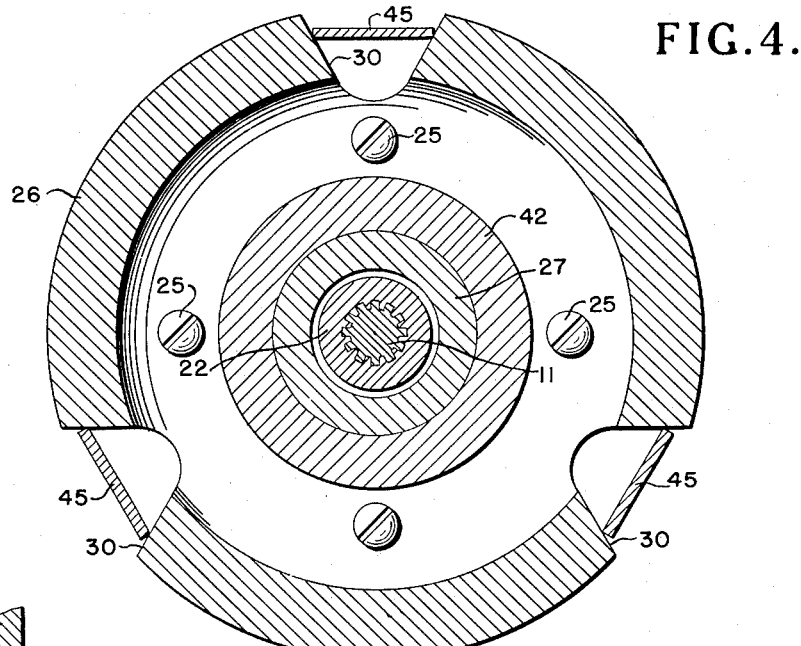
Fig. 4 is a sectional view taken along the line 4—4 of Fig. 3.

Referring more particularly to the drawings wherein like numerals indicate like parts throughout the several views, 10 indicates, generally, the coupling of the present invention which joins shaft 11 of a synchro control transformer 12 and shaft 13 of an indexing mechanism 14. The indexing mechanism 14 comprises a fixed disk portion 9 having formed thereon a journal box 8, and a spider 7 having arms 6. Bolted on arms 6 is end plate 5 to which the transformer 12 is bolted. Shaft 11 is splined to fixedly receive a drive washer 15 having outwardly turned tabs 16. Mounted between washer 15 and bearing 17 of transformer 12 is a spacer 18.

Tabs 16 are fitted into groove 19 of flange 21 of hub 22 which is secured on shaft 11 by nut 23 threaded on shaft 11 as at 24. Nut 23 also retains washer 15 and spacer 18 on shaft 11.

Secured on flange 21 by a plurality of screws 25 is a cupped-out disk member 26 having a spherical hub 27. Bore 28 in hub 27 loosely fits over hub 22. Screws 25 pass through enlarged bores 31 of disk member 26. Thus it will be apparent that disk 26 may be moved to an adjusted position with respect to the axis of shaft 11 to cause disk 26 to rotate concentrically with respect to the axis of rotation of the shaft when the shaft through accidental bending or other causes rotates slightly eccentrically thereto.

A plurality of V-shaped notches 30 is formed in the periphery of the disk 26 for a purpose to be hereinafter more fully described.

A flanged hub member 32 is fixed on shaft 13 of indexing member 14 by set screw 33 which is received in key way 34, member 32 having a reduced hub extension 35 formed thereon. Member 32 is provided with a plurality of bores 36 through flange 37 thereof. A collar 38 is supported on flange 37 by screws 39 which pass through bores 36 of flange 37 and threadedly engage bores in collar 38. A clearance is provided between bores 36 and screws 39 to permit adjusting movement of collar 38 with respect to member 32 in the same manner that members 21 and 26 are adjusted. Axial bore 41 is formed to provide a clearance between hub 35 and collar 38 so as to permit the aforementioned adjustment of the collar with respect to member 32. Collar 38 is provided with a reduced extension 42 through which a slightly enlarged portion 43 of bore 41 extends. Portion 43 of bore 41 engages snugly the spherical surface of hub 27 whereby the axes of rotation of members 26 and 38 are maintained in intersecting relation.

A plurality of flat shallow grooves 44 is formed in the periphery of collar 38. Respectively mounted in grooves 44 are flat metal fingers 45, each of which has a hole 46 in one end thereof through which an attaching screw 47 passes to secure each finger 45 to collar 38, each of the fingers 45 having a rounded head at the other end thereof. The fingers 45 by reason of the aforementioned construction are characterized by circumferential stiffness and radial flexibility. Thus a rotary drive is provided which is positive, without lost motion and which transmits torque without causing bending of the shafts which are interconnected thereby. In assembling fingers 45, the fingers are bent slightly inwardly in order to ensure a yieldable contact thereof with the tapered walls of notches 30. Fingers 45 thus form a driving medium between the collar 38 and the disk member 26 to transfer rotative motion from shaft 13 to shaft 11.

In the particular application of the device of the present invention as illustrated in Fig. 1 of the drawings it is, as aforementioned, of particular importance that the coupling does not transmit bending forces to shaft 11 of synchro control transformer in order to provide accurate electrical signal output thereof.

In assembling the preferred form of the invention, it is apparent that each of the coupling members 26 and 38 may be adjusted to rotate concentrically with respect to the axes of rotation thereof by loosening the screws 25 or 39, as the case may be, and moving the coupling member with respect to the hub member associated therewith. Spherical hub member 27 which is integral with member 25 is moved with member 26 during such adjustment, while reduced extension 42 into which 27 extends is integral with member 38. The adjustment is made to cause members 26 and 38 to rotate concentrically and to cause member 27 to fit freely into bore 41 of extension 42 without binding in any position. All of the aforementioned adjustments are made with fingers 45 removed. When member 27 is thus adjusted the axes of shafts 11 and 13 intersect and members 26 and 38 rotate concentrically with their respective shafts.

With the fingers 45 installed, even rotary motion is transmitted from shaft 13 to shaft 11 by the coupling of the present invention regardless of slight deviation in angle of one of the shafts with respect to the other, the fingers riding in notches 30 to provide an even drive without backlash or lost motion, thus the shaft 11 follows accurately the angular positions of shaft 13 during the adjustments thereof by the indexing mechanism.

Figure 6:
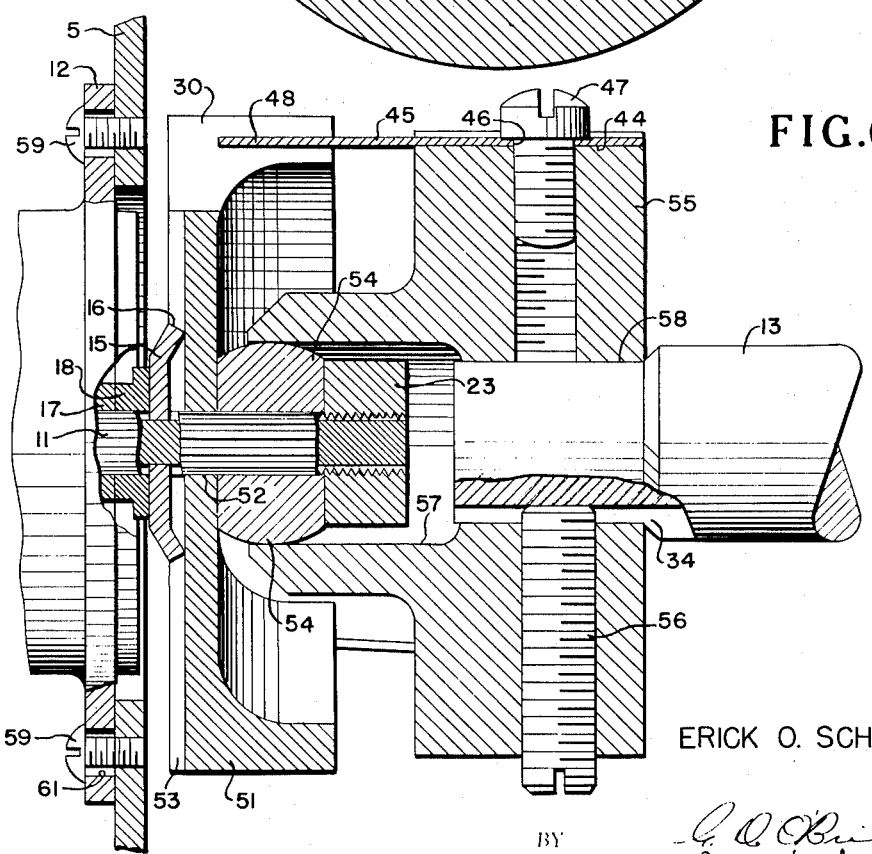
Fig. 6 is a sectional view similar to Fig. 3 of an alternative form of the present invention.

An alternate form of the invention is illustrated in Fig. 6 of the drawings wherein the final machining of the components thereof is performed while respectively mounted on the shafts 11 and 13. A cup-shaped disk member 51 is provided with a bore 52 to receive the shaft 11. Member 51 is rotatively fixed with respect to shaft 11 by the splined drive washer 15 having outwardly turned tabs 16 engaging groove 53 formed in member 51. A separate spherical member 54 is mounted on shaft 11. spacer 18 is mounted on shaft 11 between bearing 17 and washer 15. Nut 23 is threaded on shaft 11 to fixedly secure the aforementioned assembly thereon. At this point the spherical surface of member 54, being in a rough machined condition, is given a final machining while mounted on shaft 11 to provide for true concentricity of the periphery thereof with the axis of rotation of shaft 11. As will be noted, no adjustment is provided between the shaft 11 and spherical member 54 in the alternative form of the invention.

It will, also, be noted that collar 55 of the alternative form of the invention is mounted directly on shaft 13 and is fixed thereon by a set screw 56. The enlargement 57 of bore 58 in collar 55, prior to mounting on shaft 13 is rough machined. After mounting on the shaft, enlarged bore 57 is given a final machining to bring the periphery thereof into concentricity with the axis of rotation of shaft 13 and to provide a close tolerance between the surface of the bore 57 and the surface of the spherical member 54. As in the preferred form of the invention, the collar 55 and the member 51 are connected for mutual rotation by the fingers 45 which are secured in grooves 44 of collar 55 by screws 47 and rest, at the rounded head 48 thereof, in V-shaped notches 30 of member 51. In order to align member 54 in bore 57, transformer 12 is adjustably mounted on plate 5 by screws 59, the flange of 12 being provided with enlarged bores 61 in order that such adjustment may be effected.

It will thus be seen that there has been provided in the preferred and alternative forms of the present invention a coupling which eliminates stresses and strains on the shaft of a synchronous control transformer which would ordinarily be present when prior art couplings are employed and which therefore ensure accurate output of the transformer to produce more uniform results.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. Apparatus for coupling a pair of shafts the first of said shafts being the shaft of a synchro control transformer and the second of said shafts being the shaft of a driving mechanism therefor comprising, in combination, a first coupling member mounted on said first shaft, said first member having a spherical hub portion in fixed relation therewith, the spherical surface of said hub being concentric with the axis of rotation of said first shaft, a second coupling member mounted on said second shaft, an extension on said second member having a bore concentric with said second shaft, said bore receiving with close tolerance said spherical hub portion whereby the axes of said first and second shafts are caused to intersect, the periphery of said second member having a plurality of shallow grooves formed therein, the periphery of said first member having a plurality of V-cut notches formed therein, and a plurality of flexible finger members respectively fixed at one end in the grooves of said second member, said finger members extending into the V-shaped notches of the first member to provide a flexible drive between said first and second members.

2. Apparatus for coupling a pair of shafts comprising, in combination, a driving shaft, a driven shaft, a first flanged hub member fixedly mounted on said driving shaft, a first coupling member secured on the flange of said first hub member for adjustment of the axis thereof with respect to the axis of said drive shaft, said first coupling member having a hollow tubular extension along the axis thereof, a second flanged hub member fixedly mounted on said driven shaft, a second coupling member secured on the flange of said second hub member for adjustment of the axis thereof with respect to the axis of said driven shaft, said second coupling member having a hollow spherical extension along the axis thereof, said hollow tubular extension snugly receiving therein said spherical extension whereby the axes of said extensions intersect, and a plurality of yieldable finger members having circumferential stiffness and fixed at one end thereof to the periphery of said first coupling member, said second coupling member having a plurality of V-shaped notches in the periphery thereof, said plurality of fingers yieldably engaging the V-shaped walls of said notches whereby positive rotative motion is transmitted from the drive shaft to the driven shaft.

3. A coupling device of the character described comprising a shaft, a second shaft, a coupling member mounted on said first named shaft, a second coupling member mounted on said second shaft, means including a tubular element carried by said second coupling member for causing said shafts to intersect at the axes of rotation thereof, a plurality of spring fingers secured at one end to one of said members, a plurality of V-shaped notches formed in the other one of said members and having a pair of inclined walls respectively, and means including a circular head formed on the free end of each of said spring fingers and yieldably engaging said pair of inclined walls whereby rotative movement is transmitted from one of said members to the other of said members without backlash.

4. A coupling device of the character disclosed comprising, in combination, a transformer, a transformer shaft, a drive shaft, a first coupling member secured to said drive shaft, a second coupling member secured to said transformer shaft, hub means including a tubular member mounted on the adjacent ends of said shafts for causing the shafts to intersect at the axes of rotation thereof, a plurality of notches formed in said second coupling member, each of said notches having a pair of inclined walls, and a plurality of resilient elements fixed at one end thereof to the periphery of the first member, having a circular head formed on the other end thereof and yieldably engaging a pair of said inclined walls whereby positive rotative movement is transmitted from one of the members to the other of said members.

5. A device of the character disclosed comprising, in combination, a drive shaft, a driven shaft in axial alignment with said drive shaft, a first coupling member secured to said drive shaft, a second coupling member secured to said driven shaft, hub means carried by said second coupling member, a tubular extension carried by said first coupling member snugly engaging said hub means for maintaining the axes of said shafts in mutual intersecting relation, a plurality of V-shaped notches formed in the periphery of said second coupling member and having a pair of inclined walls respectively, a plurality of spring elements secured to said first coupling member, each of said spring elements having a circular head formed thereon yieldably engaging each of said pairs of inclined walls respectively whereby positive rotary movement is transmitted from the drive shaft to the driven shaft.

References Cited in the file of this patent
UNITED STATES PATENTS 2,558,158    Rock _____ June 26, 1951